March 11, 1952 A. O. KUTZ 2,588,985
CLUTCH WITH REMOVABLE LINING
Filed Feb. 3, 1947 2 SHEETS—SHEET 1

INVENTOR
ARTHUR O. KUTZ
BY Paul L. Krohn
ATTORNEY

March 11, 1952        A. O. KUTZ        2,588,985
CLUTCH WITH REMOVABLE LINING
Filed Feb. 3, 1947        2 SHEETS—SHEET 2

INVENTOR
ARTHUR O. KUTZ
BY Paul L. Krohn
ATTORNEY

Patented Mar. 11, 1952

2,588,985

UNITED STATES PATENT OFFICE 2,588,985

CLUTCH WITH REMOVABLE LINING

Arthur O. Kutz, Buffalo, N. Y., assignor to Fairbanks, Morse & Co., Chicago, Ill., a corporation of Illinois Application February 3, 1947, Serial No. 726,051

2 Claims. (Cl. 192—88)

This invention relates to improvements in the mounting of a clutch assembly between the driving and driven members of a working organization, such as might be exemplified by a prime mover operatively connected with mechanism or means to be driven thereby.

While the invention may have many and varied useful applications requiring the interposition of a clutch, the present embodiment will be found of particular importance in marine propulsion applications because of the limited space provisions usually encountered in such installations. Generally marine propulsion installations must be exceedingly compact, yet exhibit a high degree of accessibility for purposes of servicing and repair operations. In most instances the several units of such an assembly are substantially constructed and hence not easily handled, except with the aid of hoisting and such other equipment as may be most readily applied in the cramped space available. Thus the initial design of marine propulsion components must embody careful consideration leading to ease of installation and subsequent inspection, servicing and repair accessibility.

Accordingly, this invention is primarily directed to the provision of a clutch assembly for use in interconnecting a driving member and a driven member, and to the construction and mounting features of such a clutch as will fully satisfy the above noted assembly considerations.

More specifically it is an important object to provide a clutch assembly embodying improved features of construction such as will enable its application and use in closely confined installations of a prime mover and driven unit, and such as will further eliminate the need for shifting or moving either the prime mover or driven unit in order initially to install or subsequently remove the same for servicing and repair or replacement.

It is also an object hereof to provide an improved clutch which is capable of being moved into and out of its desired assembly relationship between driving and driven members in a relatively collapsed condition, which will necessitate minimum space requirements and which will afford improvements for facilitating its attachment to and removal from the associated members.

Another object of the invention is to be found in the improved mounting provisions of a clutch assembly which will carry out the above noted objects and also enable the attainment of a minimum spacing between the driving and driven members when considered in connection especially with marine propulsion installations.

Other objects and advantages will appear from the following detailed description of one form of the invention as disclosed in the accompanying drawing, wherein.

Figures 1, 3, 4:
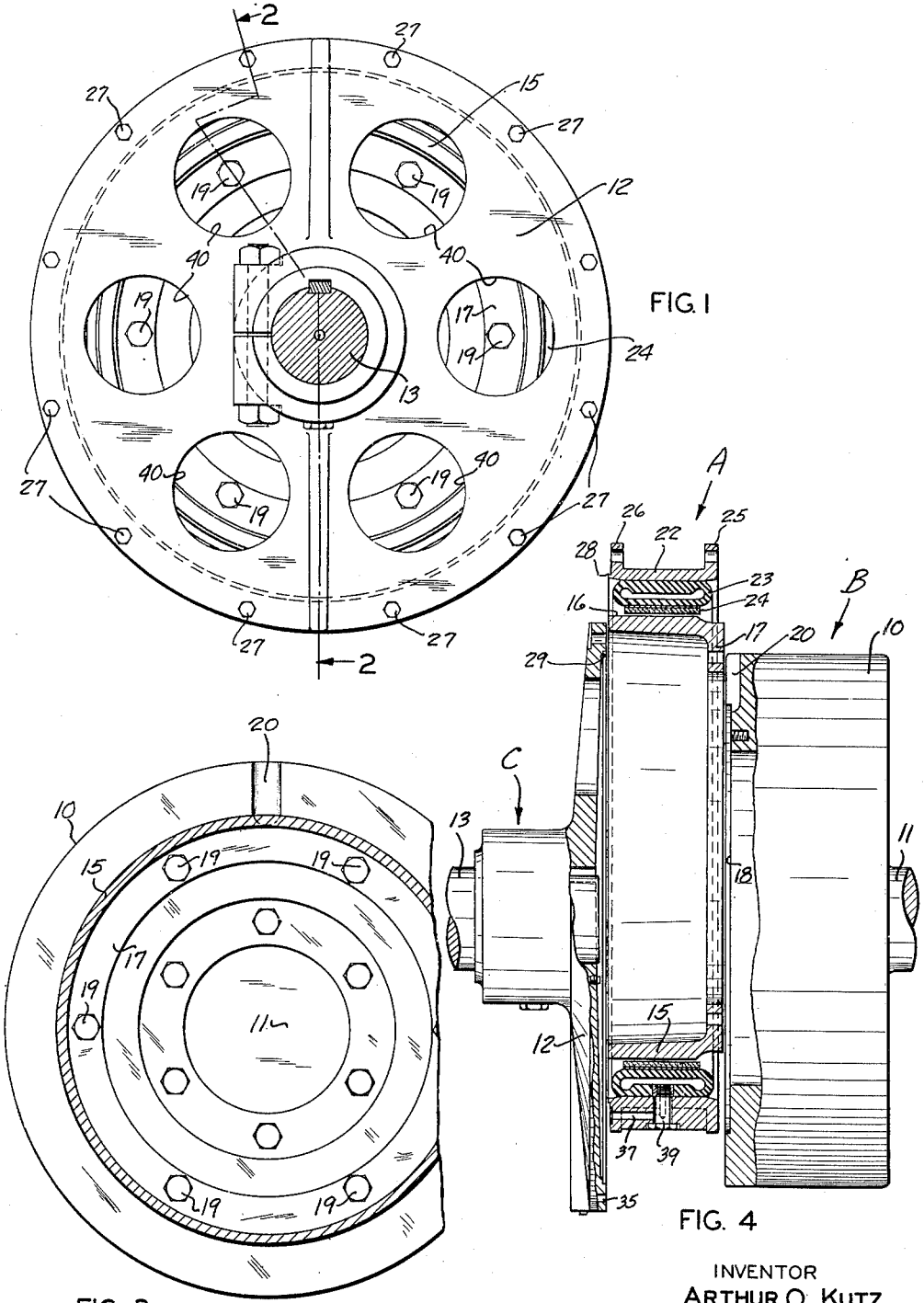
Fig. 1 is a view in elevation of the present clutch assembly showing certain improved features thereof.
Fig. 3 is a partial sectional elevational view of one portion of the assembly as seen along line 3—3 of Fig. 2.
Fig. 4 is a view of the clutch assembly and driving and driven members showing, in section, the relation of the clutch to the associated units when conditioned for movement into or out of the operative position as shown in Fig. 2.
Figure 2:
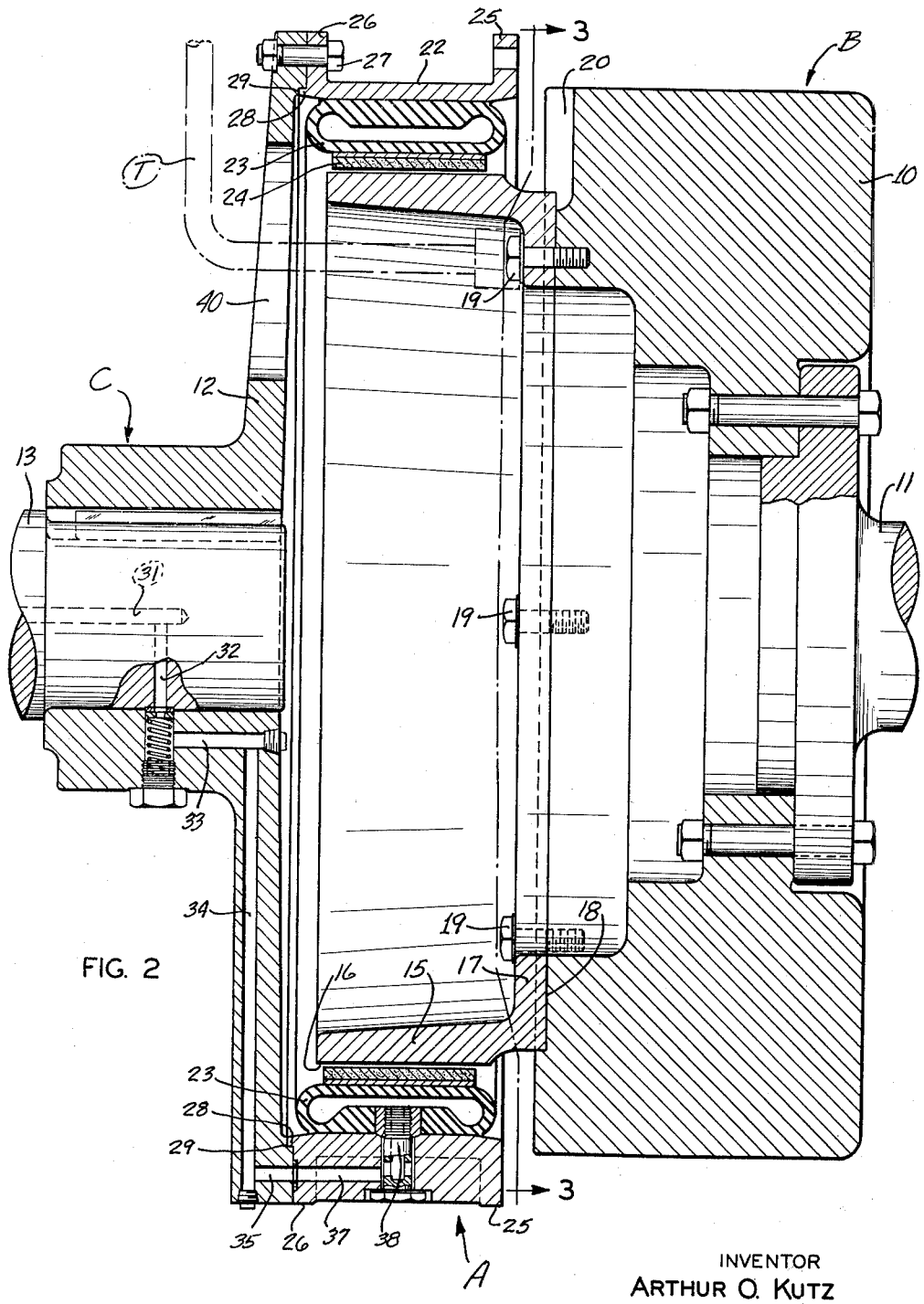
Fig. 2 is an enlarged, longitudinal and sectional elevational view of the clutch as the same would appear in operative relation between adjacent portions of driving and driven members, the view being taken along line 2—2 in Fig. 1.

Referring in greater detail to the several views of the drawing, the present invention may be understood as comprising the improved drive or clutch assembly A for use in interconnecting adjacent portions of a driving member B and a driven member C. In the present embodiment, the adjacent portion of the driving member B may be the usual flywheel 10 which is conveniently bolted to the projecting end of the prime mover drive shaft 11. The driven member C of the present disclosure comprises a spider disc 12, the split hub of which is clamped and suitably keyed to the end of the driven shaft 13, as shown in Figs. 1 and 2.

With reference to the drive or clutch assembly A and the mounting features thereof, it will be noted that the clutch comprises an inner clutch element or ring 15 having an axially directed and cylindrical outer clutch-shoe engaging surface 16 and an inwardly directed bolt flange 17 which is adapted to be received in a recess 18 formed in the adjacent face of the flywheel and secured by a plurality of bolts 19. In addition to the recess 18 which serves to center the inner clutch ring 15, there is provided a radially directed slot 20 in the flywheel which enables the use of a lever for effecting initial break-away movement or displacement of the ring when removal of the clutch assembly is required.

The clutch assembly also includes an outer clutch element or ring 22 to the inner cylindrical surface of which is suitably bonded or otherwise secured an expansible-collapsible clutch element 23 carrying the clutch shoe 24. The outer ring 22 is peripherally and outwardly flanged at 25 and 26 and the flange 26 is utilized as the bolt flange whereby the same may be securely attached to the spider disc 12 by bolts 27. Furthermore the outer ring 22 is formed with an axially directed centering flange 28 which finds seating engagement in a complementary recess 29 in the spider disc 12.

For completeness of present disclosure, the member C is shown as having drilled shaft passages 31 and 32 and drilled spider disc passages 33, 34 and 35 all of which are in communication with a passage 37 and suitable lead-in nipple 38 for the expansible clutch element 23. Thus an actuating fluid, such as air, from a remotely controlled source (not shown) may be admitted to the element 23 for expanding the same into shoe engaging relation about the inner clutch element 15 when power is to be transmitted between the driving and driven members B and C respectively. Evacuation and hence collapse of element 23 is also effected by means of these communicating passages.

A particularly important feature of the present invention is disclosed in Figs. 1 and 2 wherein it is evident that the clutch mounting provisions above described enable an improved and advantageous close-coupled assembly of members B and C without imposing difficult assembly and service problems. For example, the attachment of the outer clutch ring 22 to the spider disc 12 is exposed and hence fully accessible from the exterior of the assembly, and more importantly the provision of a plurality of access openings 40 in the spider 12 permits the ready use of a suitable tool, such as that indicated in phantom outline at T in Fig. 2, for threading up or removing the several securing bolts 19 in the bolt flange 17 of the inner clutch ring 15. It is preferred that the spider disc 12 be provided with access openings 40, equal in number to the bolts 19 utilized for securing the inner clutch ring 15 to the flywheel 10, as shown in Fig. 1. In a clutch mounting of the present character the minimum of space is necessary as the inner series of securing bolts 19 may be inserted or removed through the spider openings 40 without necessitating added clearance space over that already determined by the axial dimension of the combined clutch rings. This same feature obtains for the outer series of securing bolts 27 at the flange 26 of the outer clutch ring 22.

As shown in Fig. 4, the assembly or removal of the clutch assembly A is easily accomplished by relatively axially collapsing the inner and outer clutch rings 15 and 22 to an extent sufficient to provide clearance space at the flywheel face and at the face of the spider disc. Thus it is possible to move the clutch assembly A into and out of position from the side of the members B and C, all without first having to disturb the position of either of the latter members. This feature is of prime importance in those situations where the driving and driven members are heavy and where the space accommodations of the whole assembly are restricted.

The foregoing description is pertinent to the presently preferred embodiment of the invention shown in the drawing, but it should be understood that the principal features of the improved clutch mounting between a driving and a driven member may be found to have a broad field of use, with some modifications, and consequently may be applied to other and modified assemblies without departing from the spirit or full intended scope of the invention as the same is defined in the appended claims.

I claim:

1. In a clutch mounting, the combination of a driving member having a recess formed in a face thereof, a driven member formed with a recessed face and further having a series of access openings located in annularly spaced relation inwardly of the face recess, said driving and driven members being relatively axially spaced with said recessed faces in opposing relationship, and a drive clutch assembly operatively positionable between said members and including an outer ring element detachably connected with said driven member and formed with a flanged portion for seating engagement in the recessed face thereof, and an inner ring element operatively related with said outer ring element and provided with a flanged portion for seating engagement in the recessed face of said driving member, the flanged portion of said inner ring element being adapted for detachable connection with said driving member and accessible through said series of access openings in the driven member, said drive clutch assembly, upon detachment of said outer and inner ring elements from seating engagement with said driven and driving members respectively, being adapted for removal from between said driving and driven members without disturbing the axially spaced relation of said members.

2. In a clutch mounting arrangement, the combination of a rotary driving member having a clutch mounting face, a rotary driven member in axial alignment with the rotary driving member and providing a clutch mounting face opposed to the clutch mounting face of said driving member, the driving and driven members being relatively operatively positioned such as to effect a predetermined minimum relative axial spacing of the clutch mounting faces thereof, and a clutch assembly between said members, said assembly including concentrically related outer and inner ring elements, the outer ring element having a flange seating against said mounting face of the driven member and detachably secured thereto, said inner ring element having an inwardly directed flange seating against said mounting face of the driving member, securement elements detachably securing the flange of said inner ring element to said face of the driving member, and said driven member having openings therein providing access to said securement elements, said inner and outer ring elements each having an axial dimension less than but approximating said predetermined minimum axial spacing of the mounting faces of the driving and driven members, whereby said clutch assembly upon detachment of said inner and outer ring elements from said mounting faces, may be removed as a unit laterally from between the driving and driven members without disturbing the operative positions of the members.

ARTHUR O. KUTZ.

REFERENCES CITED

The following references are of record in the file of this patent:

UNITED STATES PATENTS

| Number | Name | Date |
|---|---|---|
| 2,111,422 | Fawick | Mar. 15, 1938 |
| 2,237,864 | Fawick | Apr. 8, 1941 |
| 2,278,068 | Fawick | Mar. 31, 1942 |
| 2,304,031 | Schmitter | Dec. 1, 1942 |
| 2,304,032 | Schmitter | Dec. 1, 1942 |
| 2,311,597 | Schmitter | Feb. 16, 1943 |
| 2,354,174 | Schmitter | July 18, 1944 |